United States Patent [19]

Masuda et al.

[11] Patent Number: 5,419,942

[45] Date of Patent: May 30, 1995

[54] BASE FILM OF DIGITAL COMPACT CASSETTE TAPE

[75] Inventors: Narihiro Masuda, Yokohama; Masashi Inagaki, Tsukui, both of Japan

[73] Assignee: Diafoil Hoechst Company, Limited, Tokyo, Japan

[21] Appl. No.: 4,261

[22] Filed: Jan. 14, 1993

[30] Foreign Application Priority Data

Jan. 16, 1992 [JP] Japan .................................. 4-005914

[51] Int. Cl.$^6$ .............................................. B32B 7/00
[52] U.S. Cl. ...................................... 428/141; 428/143; 428/212; 428/213; 428/323; 428/480; 428/694 SG
[58] Field of Search ................ 428/206, 212, 213, 323, 428/409, 480, 694 TR, 694 BR, 694 SG, 910, 141, 143; 264/211.12; 156/244.11

[56] References Cited

U.S. PATENT DOCUMENTS

| | | | |
|---|---|---|---|
| 4,670,319 | 6/1987 | Katoh et al. | 428/141 |
| 4,687,699 | 8/1987 | Hensel et al. | 428/213 |
| 4,687,700 | 8/1987 | Hensel et al. | 428/213 |
| 4,812,360 | 3/1989 | Utsumi | 428/337 |
| 4,876,137 | 10/1989 | Utsumi | 428/141 |
| 5,069,949 | 12/1991 | Matsuda et al. | 428/141 |
| 5,212,006 | 5/1993 | Shigeo | 428/141 |
| 5,314,736 | 5/1994 | Kawaguchi et al. | 428/143 |
| 5,316,823 | 5/1994 | Etchu et al. | 428/141 |
| 5,336,079 | 8/1994 | Okazaki et al. | 428/323 |
| 5,366,783 | 11/1994 | Utsumi et al. | 428/141 |

FOREIGN PATENT DOCUMENTS 0347646 12/1989 European Pat. Off. .

OTHER PUBLICATIONS

Database WPIL, Week 9136, Derwent Publications Ltd., London, GB.

*Primary Examiner*—Patrick J. Ryan
*Assistant Examiner*—Marie R. Macholl
*Attorney, Agent, or Firm*—Foley & Lardner

[57] ABSTRACT

A base film of a digital compact cassette tape comprising at least two layers consisting of laminated biaxially oriented polyester films, one surface of which has center line average roughness of 5 to 20 nm, and the other surface of which has center line average roughness of 15 to 45 nm, and which has a Young's modulus in a machine direction of at least 600 kg/mm$^2$, which base film is excellent in running stability and electromagnetic conversion characteristics.

16 Claims, No Drawings

BASE FILM OF DIGITAL COMPACT CASSETTE TAPE

BACKGROUND OF THE INVENTION

1. Field of the Invention

The present invention relates to a base film of a tape for a digital compact cassette (hereinafter referred to as "DCC") which is excellent in running stability and electromagnetic conversion characteristics.

2. Description of the Related Art

DCC is a digital recording audio cassette system which was developed by Philips (the Netherlands) and is being practically used. Characteristics of DCC reside in that DCC is interchangeable with an analog recording type compact cassette different from a digital audio tape (DAT) since DCC does not use a rotational head but uses a fixed head for recording and reproducing, and that a DCC tape has the same tape width and uses the same tape speed as an analog recording type compact cassette tape.

A recording/reproducing head for DCC is a so-called multi-track thin layer head and has 9 channels (8 channels+1 channel). A width of each track is 185 μm, and each guard band width is 10 μm. Then, the DCC tape should have more accurate tracking against the head and better head touch than the conventional compact cassette tape.

In the case of the conventional compact cassette tape, improvement of running properties is highly desired. In addition to this, the DCC tape should have the good head touch. To satisfy these requirements, improvement of the base film is greatly required.

A recording density in the DCC tape is very high and about 1 μm, while that of the conventional compact cassette tape is about 8 μm. In view of such high recording density, a surface roughness of the base film of the DCC tape should be small enough to cope with digital recording.

SUMMARY OF THE PRESENT INVENTION

An object of the present invention is to provide a base film of a DCC tape which can satisfy both good running properties and head touch.

According to the present invention, there is provided a base film of a digital compact cassette tape comprising at least two layers consisting of laminated biaxially oriented polyester films, one surface of which (Surface A) has center line average roughness ($Ra^A$) of 5 to 20 nm, and the other surface of which (Surface B) has center line average roughness ($Ra^B$) of 15 to 45 nm, and which has a Young's modulus in a machine direction of at least 600 kg/mm².

DETAILED DESCRIPTION OF THE INVENTION

The polyester to be used in the present invention is a polyester prepared from an aromatic dicarboxylic acid or its ester and a glycol. Examples of the aromatic dicarboxylic acid are terephthalic acid, isophthalic acid, 2,6-naphthalene dicarboxylic acid, adipic acid, sebacic acid, hydroxycarboxylic acids (e.g. p-hydroxyethoxybenzoic acid, etc.) and the like. They may be used independently or as a mixture. Examples of the glycol are ethylene glycol, diethylene glycol, 1,4-cyclohexanedimethanol, butanediol, neopentyl glycol, and the like. They may be used independently or as a mixture. Preferably, in the polyester, 80% by mole or more of repeating units are ethylene-terephthalate repeating units or ethylene-2,6-naphthalate repeating units.

For the purpose of illustration, a smooth surface of the base film of the present invention is designated as Surface A, and a layer which has Surface A is designated as Layer A. An easily slipping surface of the base film is designated as Surface B, and a layer which has Surface B is designated as Layer B. If the base film has at least one additional layer between Layers A and B, it is designated as Layer C.

The base film comprises at least two layers which are laminated by coextrusion. A structure of the laminated film in the thickness direction may be A/B or A/C/B. Layer C may comprise a laminated film or may be produced from a part or all of recycled wastes such as edges which are generated in the production step of the base film.

The compositions of the polyesters in Layers A, B and C may be the same or different.

Preferably, the polyester has a melt viscosity of 500 to 20,000 poises at 280° C. at a shear rate of 100/sec. More preferably, the melt viscosities of the polyesters in the two layers satisfy the equation:

$$|log_{10}\eta_1 - log_{10}\eta_2| \leq 0.5$$

in which $\eta_1$ (poise) and $\eta_2$ (poise) are melt viscosities of the polyesters of arbitrary two layers of the base film. These viscosity conditions are preferable for achieving uniform thickness of the base film, or adjusting a thickness ratio of the layers.

In a preferred embodiment, a thickness ratio of Layer A to Layer B or of layer A to a sum of the thicknesses of Layers B and C is at least 1:1, preferably at least 2:1. When this ratio is smaller than 1, the surface roughness of Layer A is increased by the influence of particles contained in Layer B or Layer C.

Preferably, a thickness of Layer B is at least 1 μm. When the thickness of Layer B is smaller than 1 μm, the particles removed from Layer B and may cause drop-outs.

The center line average roughness of Surface A ($Ra^A$) is from 5 to 20 nm, preferably from 7 to 15 nm. When $Ra^A$ is smaller than 5 nm, Surface A does not have a minimum slip property for coating a magnetic paint thereon. When $Ra^A$ is larger than 20 nm, a surface smoothness of a magnetic layer is influenced by the surface roughness of Surface A, so that the head touch of the tape may be deteriorated.

A ten-point average surface roughness of Surface A ($Rz^A$) is preferably not larger than 200 nm, more preferably not larger than 150 nm. When $Rz^A$ exceeds 200 nm, a high surface protuberance which is occasionally present may deteriorate the head touch, even when the center line average surface roughness $Ra^A$ is in the above range. Preferably, on Surface A, the number of coarse protuberances larger than 1.62 μm is not larger than 5 per 25 cm² When this number exceeds 5, the number of drop-outs of the digital signals tends to increase.

To achieve the above surface roughness on Surface A, substantially inactive fine particles are provided to the polyester which forms Layer A.

Such fine particles have an average particle size of 0.05 to 1.0 μm, preferably 0.1 to 0.5 μm. An amount of the fine particles is from 0.05 to 1.0% by weight, preferably from 0.1 to 0.5% by weight of the polyester. While the fine particles may be prepared by precipitating a catalyst residue in a suitable step of the polymerization of the polyester, fine particles an average particle size of which is adjusted in the above range are preferably used in order to decrease the number of coarse particles.

Specific examples of such inactive particles are calcium carbonate, amorphous silica, titanium oxide, kaolin, silica particles generated from substantially spherical colloidal silica, crosslinked polystyrene particles, and the like. Among them, monodisperse particles are preferred in view of the decrease of the number of drop-outs. These particles may be a mixture of two or more kinds of particles, or a mixture of the same kind particles having different particle sizes.

The center line average roughness of Surface B ($Ra^B$) is from 15 to 45 nm, preferably from 25 to 35 nm. When $Ra^B$ is smaller than 15 nm, a coefficient of friction of the surface against a guide pin or a pad increases when the tape runs in the DCC deck. When $Ra^B$ is larger than 45 nm, the effect for improving the running property due to the decrease of the friction of coefficient is saturated, while the coarse protuberances tend to appear unpreferably.

A ten-point average surface roughness of Surface B ($Rz^B$) is preferably not larger than 500 nm, more preferably not larger than 400 nm. In the case where $Rz^B$ exceeds 500 nm, when the magnetic layer is formed on Surface A, and the magnetic tape is wound and heat hardened, the surface roughness of Surface B is transferred to the magnetic layer surface to form indentations which may cause the drop-out. By the same reason as above, preferably the number of coarse protuberances larger than 1.62 $\mu$m is not larger than 20 per 25 cm$^2$ Further, the number of minute protuberances on Surface B is preferably at least 10,000 per 1 mm$^2$ When the number of minute protuberances on Surface B is 15,000 or larger, the running property of the tape is considerably improved.

To achieve the above surface roughness on Surface B, substantially inactive fine particles are provided to the polyester which forms Layer B as in the case of Surface A.

Such fine particles have an average particle size of 0.1 to 1.0 $\mu$m. An amount of the fine particles is from 1.0 to 10.0% by weight preferably. Kinds and particle sizes of the fine particles to be contained in Layers A and B may be the same or different.

The polyester film of the present invention has a Young's modulus of at least 600 kg/mm$^2$, preferably at least 700 kg/mm$^2$ in the machine direction. When the Young's modulus is less than 600 kg/mm$^2$, it is impossible to produce a thin film which can stand an impact-like tension applied to the end of the film during fast forwarding or rewinding and cope with the decrease of the film thickness necessary for the long-time recording.

To achieve the Young's modulus of at least 600 kg/mm$^2$ in the machine direction, restretching in the machine direction after the stretching in the machine and transverse directions is effective. A stretching temperature and a draw ratio of the restretching in the machine direction vary with the composition of the polyester. In general, the stretching temperature is from a stretching temperature in the transverse direction to (the stretching temperature in the transverse direction plus 70° C.), and the draw ratio is from 1.05 to 2.0.

The production of the polyester film of the present invention will be explained.

After a compound for Layer A, a compound for Layer B and optionally a compound for Layer C are separately dried, if necessary, they are charged in the respective extruders, extruded at an extrusion temperature and laminated before a slot die of a feed block type coextruder or in a slot die of a manifold type coextruder to form an integrated laminate, and then, the laminate is melt extruded in the sheet form and cooled on a casting drum to obtain an unoriented film. Preferably, the laminate sheet is cooled and solidified by an electrostatic pinning method since the film having the uniform thickness is produced.

Preferably, filters corresponding to at least #1200 mesh and at least #600 mesh are attached to the extruders for Layer A and Layer B, respectively, and the polyester resin is extruded while filtering it, whereby the number of the coarse protuberances is decreased and, in turn, the number of drop-outs is decreased.

In each melt line, a static mixture and a metering pump can be provided to maintain the uniformity of the film thickness.

Then, the film is biaxially oriented. Either of sequential biaxial orientation and simultaneous biaxial orientation can be employed. In particular, the sequential orientation by which the unoriented film is first oriented in a machine direction and then in a transverse direction is preferable.

In the step of orientation in the machine direction, an orientation temperature suitable for the specific polyester composition is selected from a temperature range between 50° C. and 180° C., and a draw ratio is selected from a range between 2.0 and 9.0 times.

Though the orientation may be carried out in one step, it can be carried out in two or more steps insofar as the orientation temperature and the draw ratio are in the above ranges, whereby the smoothness of Surface A and the easy slipping property of Surface B are both satisfied.

A stretching rate in the machine direction is preferably from 5000 to 70,000%/min. in view of the uniformity of the film thickness.

In general, a tenter is used for the orientation of the film in the transverse direction. Preferably, the film is oriented in the transverse direction at an orientation temperature of 80° to 170° C., at a draw ratio of 3.0 to 6.0 and at a stretching rate of 100 to 20,000%/min.

To obtain the polyester film having the Young's modulus of at least 600 kg/mm$^2$ in the machine direction, after the restretching in the machine direction as explained above, the oriented film may be heat set at a temperature of 170° to 250° C., preferably 180° to 230° C. for 1 to 60 seconds.

PREFERRED EMBODIMENTS OF THE INVENTION

The present invention will be illustrated by the following Examples, which will not limit the scope of the present invention. In Examples, "parts" are by weight.

In the Examples, the properties are measured or evaluated as follows:

(1) Surface Roughness

Center Line Average Roughness Ra and Ten-Point Average Surface Roughness Rz

Using a surface roughness tester (SE-3F manufactured by Kosaka Kenkyusho, Ltd.), the center line average roughness Ra and the ten-point average surface roughness Rz are measured according to JIS B0601-1976 with necessary modifications. The measuring conditions are the use of a contact needle having a tip radius of 2 μm, 30 mg of probe contact pressure, 0.08 mm of cutoff, and 0.8 mm of a measuring length.

The measurement is performed at 12 points on the film and the measured values at 10 points were averaged with neglecting the maximum and minimum values to obtain Ra and Rz.

(2) The Number of Coarse Protuberances

Aluminum is vapor deposited on the film surface, and the number of coarse protuberances which cause interference bands of the fourth or higher order at a wavelength of 0.54 μm is counted by a two light beam microscope and converted to the number per 25 cm$^2$.

(3) Young's Modulus of the Film in the Machine Direction

Using a tensile tester (Model 2001 manufactured by Intesco Co., Ltd.), a test film having a length of 300 mm and a width of 20 mm, which has been temperature and moisture conditioned for 24 hours in a room kept at 23° C., 50%RH, is pulled at a strain rate of 10%/min. From an initial linear portion of a tensile stress-strain curve, the Young's modulus is calculated according to the following equation:

$$E = \Delta\sigma/\Delta\epsilon$$

wherein E is a tensile modulus (kg/mm$^2$), $\Delta\sigma$ is a stress difference between two points on a line based on the original cross sectional area, and $\Delta s$ is a strain difference between the two points.

(4) Coefficient of Dynamic Friction Against a Metal Pin

A coefficient of dynamic friction of Surface B of the tape against a fixed hard chromium-plated metal pin having a diameter of 6 mm and a surface roughness of 3S is measured at an angle of contact ($\theta$) of 135° with contacting Surface B to the metal pin.

The film is run at a speed of 1 m/min. with applying a tension T$_2$ of 53 g at one end and T$_1$ (g) at the other end is measured. The coefficient of friction is calculated according to the following equation:

$$\mu_d = (1/\theta) \times \ln(T_1/T_2) = 0.424 \times \ln(T_1/53)$$

(5) Head Touch

Electromagnetic Conversion Characteristics

On Surface A of the film, a magnetic paint having the following composition, which has been dispersed and mixed in a ball mill for 24 hours, is coated with a gravure roll:

| Component | Parts |
| --- | --- |
| Co-cont. iron oxide (BET: 50 m$^2$/g) | 100 |
| Polyurethane resin | 10 |
| Nitrocellulose | 5 |
| Vinyl chloride/vinyl acetate copolymer | 10 |
| Lecitin | 2 |
| Polyisocyanate | 5 |
| Carbon black | 2 |
| Methyl ethyl ketone | 75 |
| Methyl butyl ketone | 75 |
| Toluene | 75 |

Before the magnetic paint is completely dried and solidified, the magnetic particles are magnetically oriented and the coated paint is dried. After super calendering the coated magnetic layer at 70° C. under a linear pressure of 200 kg/cm, the magnetic layer is cured at 70° C. for 48 hours. Then, the coated film is slit at a width of one inch and wound around a reel.

The reeled nape is set in a PCM recorder (PCM-3402 manufactured by Sony Corporation) which has the same fixed type multi-track thin layer head as the DCC for evaluating the head touch. For evaluation, a signal having a frequency of 380.8 KHz generated by a cynchroscope is recorded and reproduced at a tape speed of 19.05 cm/sec. and a head output is measured and expressed as a relative value (dB) to a value of a tape of Comparative Example 1 (0 dB).

(6) Number of Drop-Outs

The number of drop-outs of the magnetic tape produced in the same manner as in the above measurement (5) is counted by recording and reproducing the signals with the same PCM recorder under the same conditions as in the above measurement (5) using a drop-out counter set up by the applicants. The number of the signals which have the head output smaller than 70% of the average head output per 5 minutes is counted as the number of drop-outs.

(7) Number of Protuberances on Surface B

Aluminum is vapor deposited on Surface B of the film, and an enlarged photograph (magnification of 750 times) is taken by a differential interference microscope (manufactured by Karl-Zeis), and the number of protuberance per one mm$^2$ is counted.

EXAMPLES 1-5 AND COMPARATIVE EXAMPLES 1-3

Preparation of Polyethylene Resins

Polyester Resin 1

In a reactor, dimethyl phthalate (100 parts), ethylene glycol (65 parts) and magnesium acetate (0.09 part) were charged and heated to effect transesterification while evaporating methanol off. Within about 4 hours from the start of the reaction, the temperature was raised up to 230° C. to substantially complete the transesterification.

After adding ethyl acid phosphate (0.4 part) and antimony trioxide (0.04 part), the pressure in the reactor was gradually reduced from atmospheric pressure to 1 mmHg. After 4 hours, the pressure was increased to atmospheric pressure to obtain Polyester Resin 1 having a melt viscosity of 2500 poise (280° C., a shear rate of 100/sec.)

Polyester Resin 2

In the same manner as in the preparation of Polyester Resin 1 except that, after the transesterification, amorphous silica particles having an average particle size of 0.12 μm which had been classified and filtered in the form of an ethylene glycol slurry was added to the reaction mixture at a particle concentration of 0.3% by weight based on the polymer to be produced, the polymerization was carried out to obtain Polyester Resin 2 having a melt viscosity of 2000 poise (280° C., a shear rate of 100/sec.)

Polyester Resin 3

In the same manner as in the preparation of Polyester Resin 1 except that, after the transesterification, monodisperse calcium carbonate particles having an average particle size of 0.71 μm which had been classified and filtered in the form of an ethylene glycol slurry was added to the reaction mixture at a particle concentration of 2.0% by weight based on the polymer to be produced, the polymerization was carried out to obtain Polyester Resin 3 having a melt viscosity of 2000 poise (280° C., a shear rate of 100/sec.)

Polyester Resin 4

In the same manner as in the preparation of Polyester Resin 1 except that, after the transesterification, kaolin particles having an average particle size of 0.32 μm which had been classified and filtered in the form of an ethylene glycol slurry was added to the reaction mixture at a particle concentration of 2.0% by weight based on the polymer to be produced, the polymerization was carried out to obtain Polyester Resin 4 having a melt viscosity of 2000 poise (280° C., a shear rate of 100/sec.)

Polyester Resin 5

Polyester Resin 1 and spherical colloidal silica having an average particle size of 0.27 μm were dry blended at a particle concentration of 2.0% by weight based on the polymer and melt extruded with an extruder to obtain Polyester Resin 5 having a melt viscosity of 2000 poise (280° C., a shear rate of 100/sec.)

Polyester Resin 6

Polyester Resin 1 and crosslinked polystyrene particles having an average particle size of 0.16 μm were dry blended at a particle concentration of 1.0% by weight based on the polymer and melt extruded with an extruder to obtain Polyester Resin 6 having a melt viscosity of 2000 poise (280° C., a shear rate of 100/sec.)

Polyester Resin 7

Polyester Resin 1 and titanium oxide particles having an average particle size of 0.27 μm were dry blended at a particle concentration of 10.0% by weight based on the polymer and melt extruded with an extruder to obtain Polyester Resin 7 having a melt viscosity of 1800 poise (280° C., a shear rate of 100/sec.)

Preparation of Polyester Films

The resins for Layers A and B were compounded in the combinations shown in Table 1 and separately dried at 180° C. for 3 hours.

TABLE 1

|  | Resin for Surface A | Resin for Surface B | Thickness ratio of A:B |
|---|---|---|---|
| Example 1 | Resin 2, 100% | Resin 3, 100% | 9:1 |
| Example 2 | Resin 2, 100% | Resin 4, 100% | 8:2 |
| Example 3 | Resin 2, 100% | Resin 7, 100% | 9:1 |
| Example 4 | Resin 5:Resin 1 = 15:85 | Resin 5, 100% | 7:3 |
| Example 5 | Resin 6:Resin 1 = 30:70 | Resin 6, 100% | 8:2 |
| C. Ex. 1 | Resin 3, 100% | Resin 3, 100% | (Same composition) |
| C. Ex. 2 | Resin 2, 100% | Resin 2, 100% | (Same composition) |
| C. Ex. 3 | Resin 3, 100% | Resin 4, 100% | 9:1 |

The resins were charged in a two layer extruder and melt extruded at an extrusion temperature of 280° C.

The resins for Layers A and B were filtered through filters corresponding to #2000 mesh and #1200 mesh, respectively, and extrudates were joined and laminated in a feed block and extruded in a film form from a slot die. The film was cooled and solidified on a casting roll with applying the electrostatic pinning to obtain an unoriented two layer film. The amounts of the resins were adjusted so as to achieve the thickness ratio of Layers A and B shown in Table 1.

The unoriented film was stretched in the machine direction at a draw ratio of 2.4 times at 85° C. and further at a draw ratio of 1.3 times at 92° C. by roll stretching. Then, the film was stretched in the transverse direction at a draw ratio of 3.8 times at 110° C. with a tenter. The biaxially stretched film was passed through rolls which were rotated at different peripheral speeds and stretched in the machine direction again at a draw ratio of 1.25 times at 120° C. The film was supplied to the tenter and heat set at 215° C. for 15 seconds to obtain a biaxially oriented film having a total thickness of 10 μm.

COMPARATIVE EXAMPLE 4

In the same manner as in Example 1 except that, after the first stretching in the machine and transverse directions, the film was heat set under the same conditions without restretching in the machine direction, a biaxially oriented film having a total thickness of 10 μm was produced.

The characteristics of the layers and the results of the properties measurements are shown in Tables 2 and 3.

TABLE 2

|  | Example No. | | | | |
|---|---|---|---|---|---|
|  | 1 | 2 | 3 | 4 | 5 |
| Layer A: | | | | | |
| Particles | Amorphous silica | ← | ← | Spherical silica | Polystyrene |
| Particle size (μm) | 0.12 | 0.1 | 0.12 | 0.27 | 0.16 |
| Particle amount (%) | 0.3 | 0.3 | 0.3 | 0.3 | 0.3 |
| Layer B: | | | | | |
| Particles | $CaCO_3$ | Kaolin | $TiO_2$ | Spherical silica | Polystyrene |
| Particle size (μm) | 0.72 | 0.32 | 0.28 | 0.27 | 0.16 |
| Particle amount (%) | 2.0 | 2.0 | 10.0 | 2.0 | 1.0 |
| Thickness ratio A:B | 9:1 | 8:2 | 9:1 | 7:3 | 8:2 |
| Surface A: | | | | | |
| Ra (nm) | 10 | 10 | 10 | 7 | 7 |

TABLE 2-continued

|  | Example No. 1 | 2 | 3 | 4 | 5 |
|---|---|---|---|---|---|
| Rz (nm) | 85 | 90 | 80 | 80 | 70 |
| Number of coarse protuberances | 0 | 0 | 0 | 0 | 0 |
| Surface B: | | | | | |
| Ra (nm) | 27 | 34 | 32 | 28 | 24 |
| Rz (nm) | 370 | 400 | 250 | 200 | 175 |
| Protuberance Number | 11200 | 13800 | 16100 | 15700 | 18900 |
| Number of coarse protuberances | 7 | 13 | 7 | 6 | 4 |
| Young's modulus (kg/mm$^2$) | 650 | 650 | 650 | 650 | 650 |
| Coefficient of friction against metal pin | 0.18 | 0.15 | 0.18 | 0.18 | 0.19 |
| Head output (dB) | +6.0 | +5.6 | +6.3 | +6.6 | +6.8 |
| Number of drop outs | 0 | 3 | 0 | 0 | 0 |

TABLE 3

|  | Comp. Example No. 1 | 2 | 3 | 4 |
|---|---|---|---|---|
| Layer A: | | | | |
| Particles | CaCO$_3$ | Amorphous silica | CaCO$_3$ | Amorphous silica |
| Particle size (μm) | 0.72 | 0.12 | 0.72 | 0.12 |
| Particle amount (%) | 2.0 | 0.3 | 2.0 | 0.3 |
| Layer B: | | | | |
| Particles | ↑ | ↑ | Kaolin | CaCO$_3$ |
| Particle size (μm) | | | 0.32 | 0.72 |
| Particle amount (%) | | | 2.0 | 2.0 |
| Thickness ratio A:B | — | — | 9:1 | 9:1 |
| Surface A: | | | | |
| Ra (nm) | 56 | 10 | 27 | 9 |
| Rz (nm) | 850 | 90 | 370 | 80 |
| Number of coarse protuberances | 120 | 0 | 7 | 0 |
| Surface B: | | | | |
| Ra (nm) | 56 | 10 | 38 | 25 |
| Rz (nm) | 850 | 90 | 450 | 350 |
| Protuberance Number | 7200 | 8400 | 14400 | 11500 |
| Number of coarse protuberances | 120 | 0 | 13 | 7 |
| Young's modulus (kg/mm$^2$) | 650 | 650 | 650 | 470 |
| Coefficient of friction against metal pin | 0.14 | 0.35 | 0.15 | 0.18 |
| Head output (dB) | 0 | +8.2 | +1.1 | +6.1 |
| Number of drop outs | 170 | 0 | 35 | 0 |

What is claimed is:

1. A base film having outer surfaces A and B, which has a Young's modulus of at least 600 kg/mm$^2$ in a machine direction, which is useful for a digital compact cassette tape, and which comprises two biaxially oriented polyester films which are laminated by coextrusion,
   wherein one of said two films contains from 0.05 to 1.0% by weight of particles, the particles having an average particle size of 0.05 to 1.0 micrometers and provides the surface A which has a center line average roughness of 5 to 20 nanometers, and
   wherein the other of said two films has a thickness of at least one micrometer and contains from 1.0 to 10.0% by weight of particles, the particles having an average particle size of 0.1 to 1.0 micrometers, and provides the surface B which has a center line average roughness of 24 to 45 nanometers.

2. A digital recording cassette tape which contains a base film as claimed in claim 1.

3. A tape as claimed in claim 2, which further comprises a magnetic layer on surface A.

4. A base film as claimed in claim 1, wherein each of said films comprises a polyester prepared from an aromatic dicarboxylic acid and a glycol, wherein the polyester may be the same or different in each film.

5. A base film as claimed in claim 1, wherein each of said films comprises a polyester containing 80 mol % or more of ethylene-terephthalate or ethylene-2-6-naphthalate repeating units, wherein the polyester may be the same or different in each film.

6. A base film as claimed in claim 1, wherein a layer C is located between the films which provide surface A and surface B.

7. A base film as claimed in claim 1, wherein the ratio of thickness between the film having Surface A and the film having Surface B is at least 1:1.

8. A base film as claimed in claim 1, wherein the ratio of thickness between the film having Surface A and the film having Surface B is at least 2:1.

9. A base film as claimed in claim 1, wherein the center line average roughness of surface A is from 7 to 15 nanometers.

10. A base film as claimed in claim 1, which further comprises a magnetic layer on surface A.

11. A base film as claimed in claim 1, wherein surface A has a ten-point average surface roughness of not larger than 200 nanometers.

12. A base film as claimed in claim 1, wherein the center line average roughness of surface B is from 25 to 35 nanometers.

13. A base film as claimed in claim 1, wherein surface B has a ten-point average surface roughness of not larger than 500 nanometers.

14. A base film as claimed in claim 1, wherein the particles present in the two films are the same or different and are selected from one or more of the group consisting of calcium carbonate, amorphous silica, titanium oxide, kaolin, silica particles generated from substantially spherical colloidal silica, and crosslinked polystyrene particles.

15. A base film as claimed in claim 1, wherein on surface A the number of coarse protuberances larger than 1.62 micrometers is not larger than 5 per 25 cm$^2$.

16. A base film as claimed in claim 1, wherein on surface B the number of coarse protuberances larger than 1.62 micrometers is not larger than 20 per 25 cm$^2$.

* * * * *